United States Patent
Weaver et al.

(10) Patent No.: US 9,651,032 B2
(45) Date of Patent: May 16, 2017

(54) SUBMERSIBLE POWER GENERATORS AND METHOD OF OPERATING THEREOF

(71) Applicant: General Electric Company, Schenectady, NY (US)

(72) Inventors: Stanton Earl Weaver, Broadalbin, NY (US); James William Bray, Niskayuna, NY (US); Michael John Bowman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 14/564,563

(22) Filed: Dec. 9, 2014

(65) Prior Publication Data
US 2016/0160845 A1 Jun. 9, 2016

(51) Int. Cl.
*F03G 7/05* (2006.01)
*F01K 25/12* (2006.01)
(Continued)

(52) U.S. Cl.
CPC ............ *F03G 7/05* (2013.01); *E21B 41/0085* (2013.01); *F01K 25/12* (2013.01); *H02K 44/08* (2013.01);
(Continued)

(58) Field of Classification Search
CPC .... F03G 7/00; F03G 7/04; F03G 7/05; H02K 44/08–44/26; Y02E 10/10; Y02E 10/14; Y02E 10/18; Y02E 10/34; F01K 25/12
(Continued)

(56) References Cited

U.S. PATENT DOCUMENTS 3,099,131 A * 7/1963 Rosa .................. F03H 1/00
310/11
3,407,316 A * 10/1968 Masao ................ H02K 44/085
310/11
(Continued)

FOREIGN PATENT DOCUMENTS

CN 2063316 U 10/1990
CN 103001533 A 3/2013
(Continued)

OTHER PUBLICATIONS

Wang et al.,"Experimental study on effect of magnetic fields on heat transfer performance of nanofluid heat pipe", Consumer Electronics, Communications and Networks (CECNet), IEEE—Xplore, Apr. 16-18, 2011, pp. 1268-1271 Conference Location: XianNing.
(Continued)

*Primary Examiner* — Thai Ba Trieu
*Assistant Examiner* — Laert Dounis
(74) *Attorney, Agent, or Firm* — Armstrong Teasdale LLP

(57) ABSTRACT

A submersible liquid-vapor generator (LVG) includes an evaporator portion in heat transfer communication with a heat energy source. The LVG also includes a magnetic field apparatus coupled in flow communication with the evaporator portion. The LVG further includes a condenser portion coupled in flow communication with the magnetic field apparatus. The LVG also includes a hybrid working fluid including nanoparticles. The evaporator portion, the magnetic field portion, and the condenser portion at least partially define a hybrid working vapor flow path. The LVG further includes an electrically non-conductive wick structure coupled in flow communication with the evaporator portion and the condenser portion. The wick structure at least partially defines a hybrid working liquid flow path
(Continued)

extending between the condenser portion and the evaporator portion.

21 Claims, 8 Drawing Sheets

(51) Int. Cl.
*H02K 44/08* (2006.01)
*H02K 44/12* (2006.01)
*E21B 41/00* (2006.01)

(52) U.S. Cl.
CPC ........... *H02K 44/085* (2013.01); *H02K 44/12* (2013.01); *Y02E 10/34* (2013.01)

(58) Field of Classification Search
USPC .................................................. 60/643–681
See application file for complete search history.

(56) References Cited

U.S. PATENT DOCUMENTS

| | | | |
|---|---|---|---|
| 3,532,159 A | 10/1970 | Hammitt et al. | |
| 3,682,239 A | 8/1972 | Abu-Romia | |
| 3,708,704 A * | 1/1973 | Zauderer | H02K 44/10 310/11 |
| 4,388,542 A | 6/1983 | Lee et al. | |
| 4,519,447 A | 5/1985 | Wiech, Jr. | |
| 4,851,722 A | 7/1989 | Zauderer | |
| 5,086,234 A * | 2/1992 | Shiota | H02K 44/08 290/52 |
| 5,803,161 A | 9/1998 | Wahle et al. | |
| 7,982,343 B2 | 7/2011 | Kay | |
| 7,982,360 B2 | 7/2011 | Erbil et al. | |
| 8,188,638 B2 | 5/2012 | Ruffa | |
| 8,253,008 B2 | 8/2012 | Lee et al. | |
| 8,283,613 B2 | 10/2012 | Tain et al. | |
| 8,336,611 B2 | 12/2012 | Ouyang | |
| 8,418,456 B2 | 4/2013 | Tain et al. | |
| 8,438,847 B2 | 5/2013 | Chen et al. | |
| 8,601,816 B2 * | 12/2013 | Walker | H02K 44/08 310/11 |
| 9,404,392 B2 * | 8/2016 | Kare | F01K 11/00 |
| 2005/0167987 A1 * | 8/2005 | Perlo | H02K 44/085 290/1 R |
| 2009/0206697 A1 * | 8/2009 | Marshall | H02S 40/44 310/306 |
| 2012/0019098 A1 | 1/2012 | Erbil et al. | |
| 2013/0049040 A1 * | 2/2013 | Ramer | H01L 33/50 257/98 |

FOREIGN PATENT DOCUMENTS

| | | |
|---|---|---|
| CN | 202889248 U | 4/2013 |
| CN | 103334868 A | 10/2013 |
| DE | 19921066 A1 | 11/1999 |
| WO | 7901086 A1 | 12/1979 |
| WO | 03026109 A2 | 3/2003 |
| WO | 2011091482 A2 | 8/2011 |

OTHER PUBLICATIONS

Zhao et al., "Experimental Investigation of Magnetic Field Effect on the Magnetic Nanofluid Oscillating Heat Pipe", Journal of Thermal Science and Engineering Applications, ASME, Feb. 22, 2012, pp. 5.

Dunning et al., "Towards a high-temperature solar electric converter," Journal of Applied Physics, AIP Publishing, vol. 52, Issue 12 (1981), pp. 7086-7091.

Branover et al., "Promising applications of the liquid metal MHD energy conversion technology," Proceedings of the 24th Intersociety Energy Conversion Engineering Conference, 1989, IECEC-89, Washington, D.C., Aug. 6-11, 1989, vol. 2, pp. 1051-1058.

Deng et al., "Recent advances in direct solar thermal power generation," Journal of Renewable and Sustainable Energy, AIP Publishing, Apr. 14, 2009, vol. 1, Issue 5, 24 pgs.

LaVerne, M.E., "Performance Characteristics of Cylindrical Heat Pipes for Nuclear Electric Space and Undersea Power Plants," Oak Ridge National Laboratory, TN, N. p. 1971. Web. doi:10.2172/4069606.

Kaushik et al., "Solar-Assisted Liquid Metal MHD Power Generation: A State of the Art Study", Centre for Energy Studies, vol. No. 15, Issue No. 7, pp. 675-689, 1995.

International Search Report and Written Opinion issued in connection with corresponding PCT Application No. PCT/US2015/063370 dated Apr. 21, 2016.

* cited by examiner

SUBMERSIBLE POWER GENERATORS AND METHOD OF OPERATING THEREOF

BACKGROUND

The field of the disclosure relates generally to electric power generation equipment and, more particularly, to submersible liquid-vapor generators (LVGs).

Continued exploration of undersea environments requires submerged, proximate, compact, and reliable electric power generation sources with sufficient capacity to provide a high power density for extended periods of time. As such, most standard power generation devices that rely on fossil fuels are not practical for undersea operations. Also, more standard renewable power sources, e.g., wind and solar are also not available. Other exotic power generation systems include thermoelectric (TE), photon enhanced thermionic (PET), and thermophotovoltaic (TPV). In general, TE-based systems require a large temperature drop to be effective, a condition not typically found in undersea environments. PET systems and TPV systems require exposure to the sun. Nuclear and chemical conversion power generation systems are also impractical for widespread use in undersea applications (other than submarines) due to practical considerations, e.g., environmental regulations.

Many known magnetohydrodynamic (MHD) power generators have been developed for a variety of applications. These known MHD generators use a liquid metal-seeded plasma stream channeled through a Hall generator and have demonstrated efficiencies approaching 40%. However, since greater efficiencies are found with higher temperatures, such MHD systems are limited by the materials available, and such materials, excluding expensive exotic materials, are susceptible to temperature and corrosion effects. Furthermore, such known MHD systems use a two-phase fluid mixture, some with metal particles injected into and entrained therein, accelerated to high velocities and channeled through a magnetic field to generate the Hall voltage potential. However, such known MHD systems require intricate plumbing configurations for multiple flow circuits that include metal particle injection and mixing apparatus and metal particle separation apparatus. As such, known MHD systems are not suitable for extended deployments in undersea environments.

BRIEF DESCRIPTION

In one aspect, a submersible liquid-vapor generator (LVG) is provided. The submersible liquid-vapor generator (LVG) includes an evaporator portion in heat transfer communication with a heat energy source. The LVG also includes a magnetic field apparatus coupled in flow communication with the evaporator portion. The LVG further includes a condenser portion coupled in flow communication with the magnetic field apparatus. The LVG also includes a hybrid working fluid including nanoparticles. The evaporator portion, the magnetic field portion, and the condenser portion at least partially define a hybrid working vapor flow path. The LVG further includes an electrically non-conductive wick structure coupled in flow communication with the evaporator portion and the condenser portion. The wick structure at least partially defines a hybrid working liquid flow path extending between the condenser portion and the evaporator portion.

In a further aspect, a method of generating power in an undersea environment is provided. The method includes forming a hybrid working liquid including combining a liquid and nanoparticles. The method also includes transferring heat energy from a heat source into the hybrid working liquid, thereby evaporating the hybrid working liquid into a hybrid working vapor. The method further includes channeling the hybrid working vapor through a magnetic field, thereby inducing a voltage on an electric current carrying conductor. The method also includes transferring heat energy from the hybrid working vapor, thereby condensing the hybrid working vapor into the hybrid working liquid. The method further includes channeling the hybrid working liquid toward the heat source.

In another aspect, a subsea power generation assembly is provided. The assembly includes a heat exchanger and a plurality of submersible liquid-vapor generators (LVGs) coupled to the heat exchanger. Each LVG of the plurality of LVGs includes an evaporator portion in heat transfer communication with a heat energy source. Each LVG also includes a magnetic field apparatus coupled in flow communication with the evaporator portion. Each LVG further includes a condenser portion coupled in flow communication with the magnetic field apparatus. Each LVG also includes a hybrid working fluid including nanoparticles. The evaporator portion, the magnetic field portion, and the condenser portion at least partially define a hybrid working vapor flow path. Each LVG further includes an electrically non-conductive wick structure coupled in flow communication with the evaporator portion and the condenser portion. The wick structure at least partially defines a hybrid working liquid flow path extending between the condenser portion and the evaporator portion.

DRAWINGS

These and other features, aspects, and advantages of the present disclosure will become better understood when the following detailed description is read with reference to the accompanying drawings in which like characters represent like parts throughout the drawings, wherein.

Figure 1:
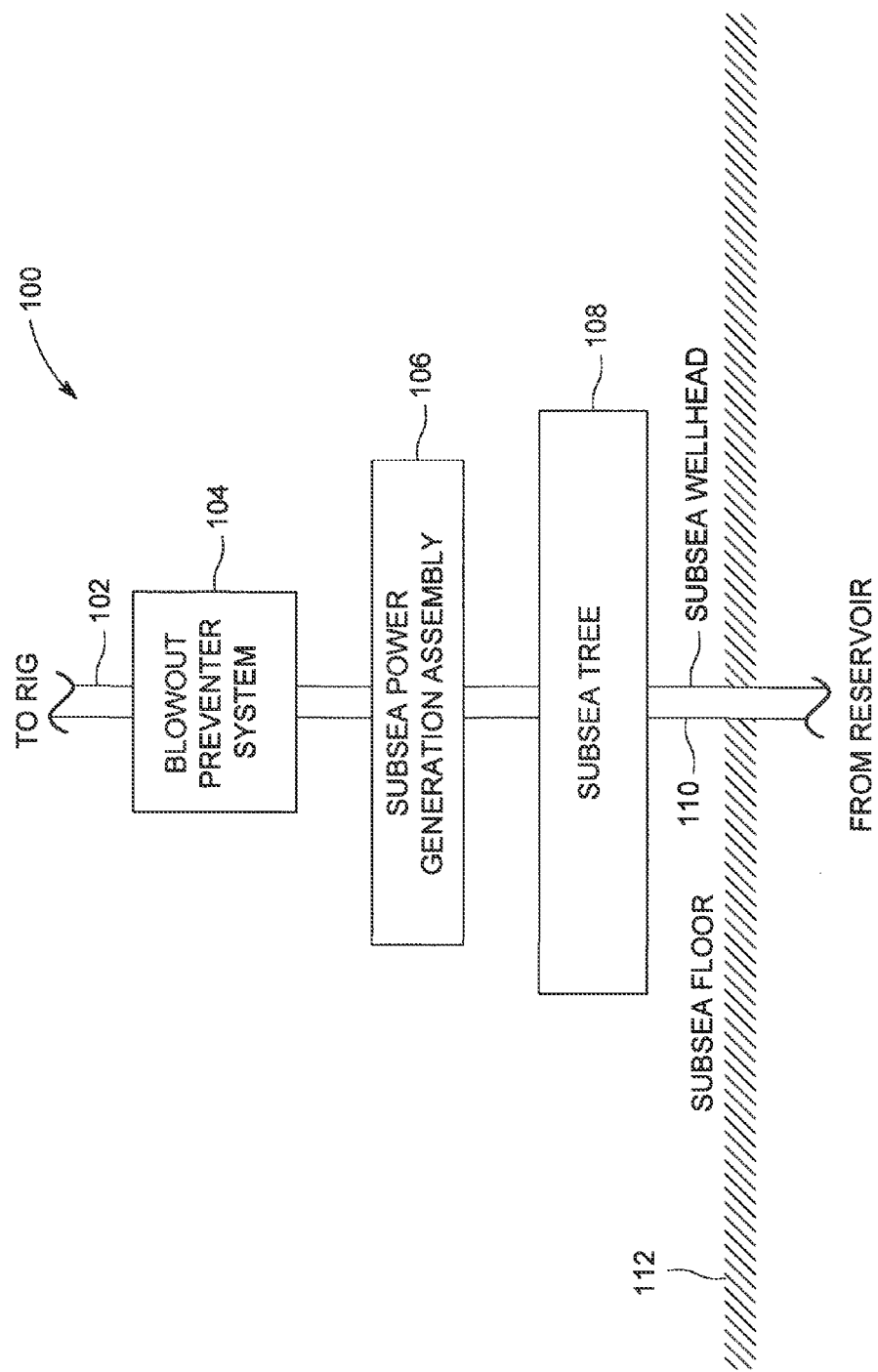
FIG. 1 is a schematic view of a portion of an exemplary submersible resource recovery system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "subsea", "undersea", and "submersible" are interchangeable.

The submersible electric power generators described herein facilitate extended operation in undersea environments, including submersible resource recovery systems. Specifically, the submersible liquid-vapor generators (LVGs) described herein use magnetohydrodynamic (MHD) apparatus with nanoparticles entrained in a two-phase fluid that is channeled through a magnetic field to generate a voltage. Such nanoparticles are substantially electrically-conducting and substantially non-magnetic materials. In contrast to known MHD systems, the nanoparticles remain entrained in the fluid as it proceeds through a hermetically closed loop cycle, i.e., as they transit through a condenser and evaporator. Particle mixers and separators are no longer required, therefore the LVGs disclosed herein are simpler, lighter, more reliable, and cheaper to assemble than known MHD systems. Entrainment of the nanoparticles is facilitated by configuring the interior channels such that transonic flow from the evaporator to the condenser through the magnetic field is enabled. Moreover, the entrained nanoparticles are configured to be light enough to facilitate the transonic flow. The hermetically-sealed configuration as described herein substantially eliminates moving parts, thereby facilitating reliability for extended submerged power generation operations. The heat transferred into the liquid and the nanoparticles and subsequently removed in the condenser is transferred to any of a variety of bottoming systems for secondary electric power generation. The LVGs as described herein are both scalable and stackable to meet the electric power needs of most known undersea configurations.

FIG. 1 is a schematic view of a portion of an exemplary submersible resource recovery system 100. System 100 includes a subsea pipeline 102 that couples system 100 in flow communication with a topside production rig (not shown). System 100 includes a blowout preventer system 104 coupled to a subsea power generation assembly 106 that includes at least one submersible liquid-vapor generation assembly (not shown in FIG. 1 and discussed further below) that includes at least one liquid-vapor generator (LVG) (not shown in FIG. 1 and discussed further below). Subsea power generation assembly 106 is coupled in flow communication with a subsea tree 108. Subsea tree 108 includes the necessary equipment, such as, and without limitation, valving, spools, manifolds, pressure gauges, and chokes to enable operation and control production of system 100 as described herein. System 100 further includes a subsea wellhead 110 extending from a subsea floor 112 up to subsea tree 108 and extending down to a reservoir (not shown). In the exemplary embodiment, submersible resource recovery system 100 is any resource recovery system including, without limitation, subsea oil and gas production systems. Alternatively, submersible resource recovery system 100 is any subsea system that enables operation of subsea power generation assembly 106 as described herein. Also, in alternative submersible resource recovery systems, the serial order of blowout preventer system 104, subsea power generation assembly 106, and subsea tree 108 may be rearranged as a function of circumstances including, without limitation, the nature of the material being recovered, the depth of the water, and the subsea geography.

Figure 2:
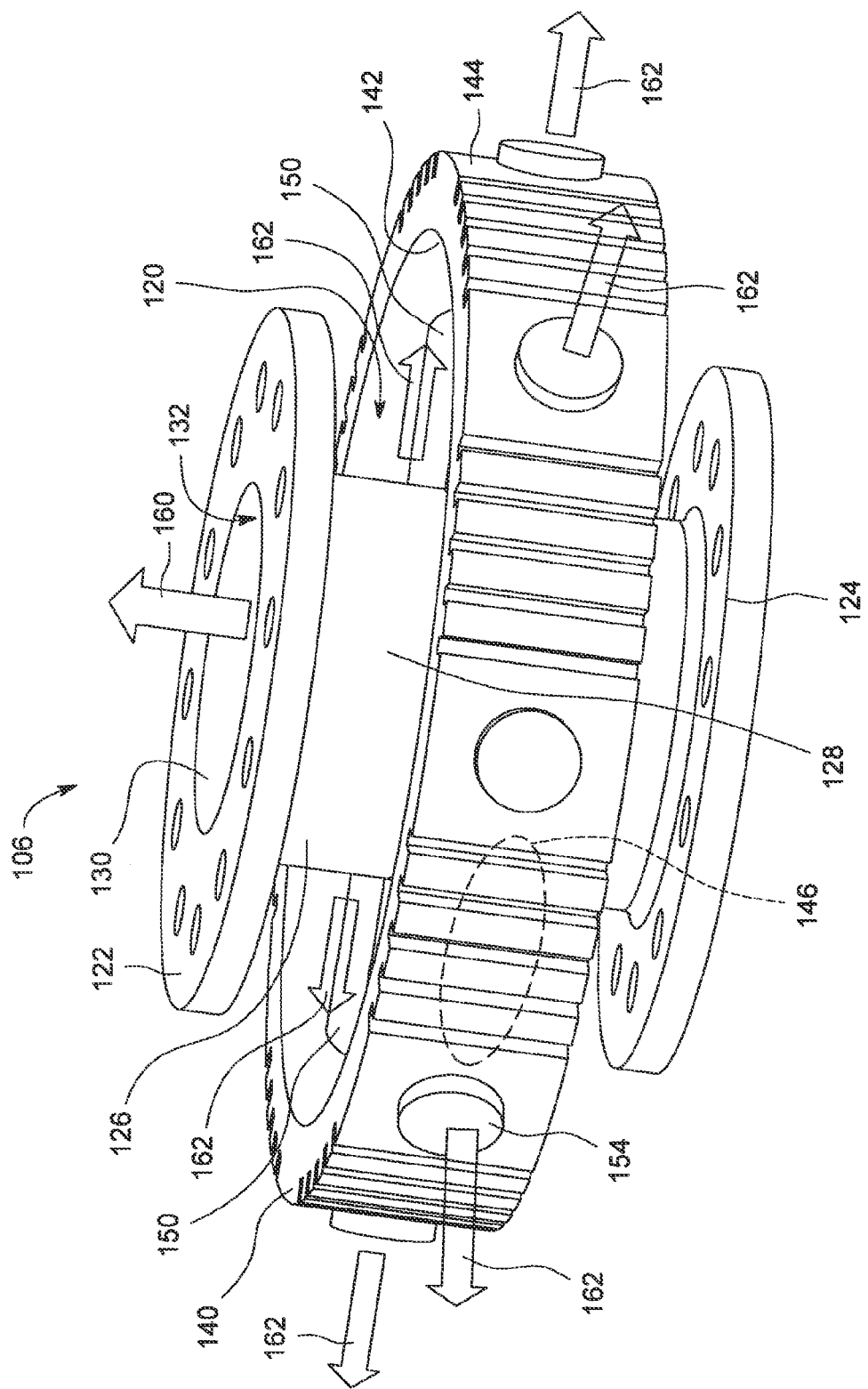
FIG. 2 is a perspective view of an exemplary subsea power generation assembly that may be used with the submersible resource recovery system shown in FIG. 1.
Figure 3:
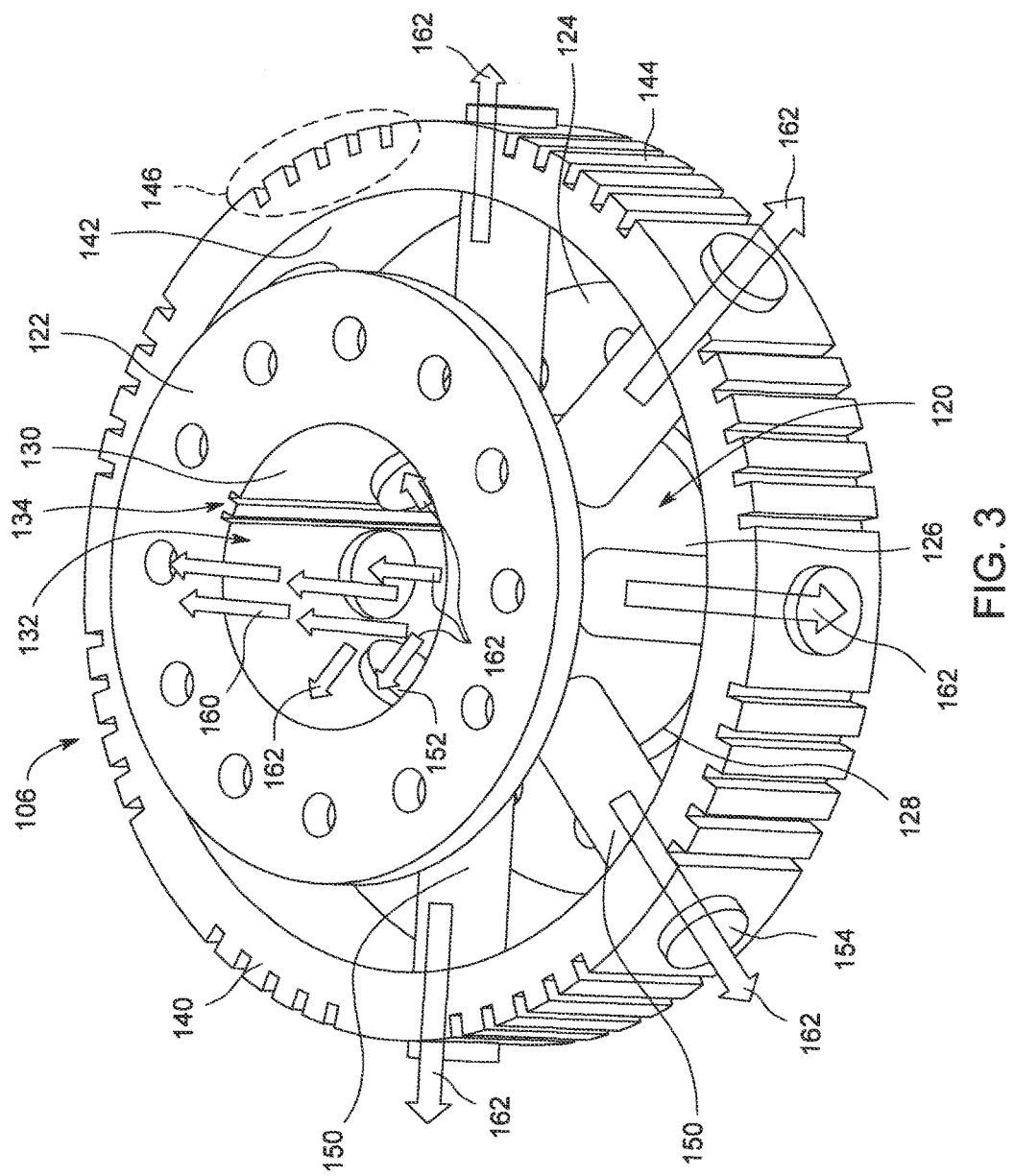
FIG. 3 is another perspective view of the subsea power generation assembly shown in FIG. 2.

FIG. 2 is a perspective view of subsea power generation assembly 106 that may be used with submersible resource recovery system (shown in FIG. 1). FIG. 3 is another perspective view of subsea power generation assembly 106. Assembly 106 includes a spool piece 120. Spool piece 120 includes a first flange 122 for coupling assembly 106 to blowout preventer system 104 and a second flange 124 for coupling assembly 106 to subsea tree 108. Spool piece 120 also includes a pipeline portion 126 extending between first flange 122 and second flange 124. Pipeline portion 126 includes an outside wall 128 and an inside wall 130 that defines a fluid channel 132. Some embodiments of inside wall 130 include alternating grooves and ridges 134 defined therein (only two grooves and one ridge shown in FIG. 3) for increasing the surface area of inside wall 130, thereby facilitating an increase in the rate of heat transfer into pipeline portion 126. Grooves and ridges 134 are configured to not inhibit a flow of fluid therein.

Also, in the exemplary embodiment, subsea power generation assembly 106 includes a heat exchanger 140. Heat exchanger 140 is substantially annular with, and extends about, pipeline portion 126. Also, heat exchanger 140 includes an inner wall 142 opposite outside wall 128 and an outer wall 144 defining plurality of alternating grooves and ridges 146 similar to those grooves and ridges 134 defined on inside wall 130. Grooves and ridges 146 increase the surface area of outer wall 144, thereby facilitating an increase in the rate of heat transfer into the surrounding environment. Heat exchanger 140 is configured to transmit heat energy to the water surrounding subsea power generation assembly 106. Alternatively, heat exchanger 140 is configured to transmit heat energy to other apparatus for collection and further practical use (described further below).

Further, in the exemplary embodiment, subsea power generation assembly 106 includes a plurality of submersible liquid-vapor generation assemblies, i.e., liquid-vapor generator (LVGs) 150. Each LVG 150 is substantially cylindrical and extends radially outward from fluid channel 132 to outer wall 144. LVG 150 includes an evaporator portion 152 that protrudes into fluid channel 132 and a condenser portion 154 that extends into the surrounding subsea environment.

In operation, a hot fluid 160 is channeled upward through fluid channel 132 from subsea wellhead 110. Hot fluid 160 transfers heat energy 162 to pipeline portion 126 and evaporator portion 152. A portion of heat energy 162 is transferred radially outward from pipeline portion 126 through each LVG 150 to condenser portion 154. A portion of heat energy 162 is transferred to heat exchanger 144 and a portion of heat energy 162 is transferred to the surrounding subsea environment. Ultimately, all of the heat energy is transferred to the surrounding subsea environment.

Figure 4:
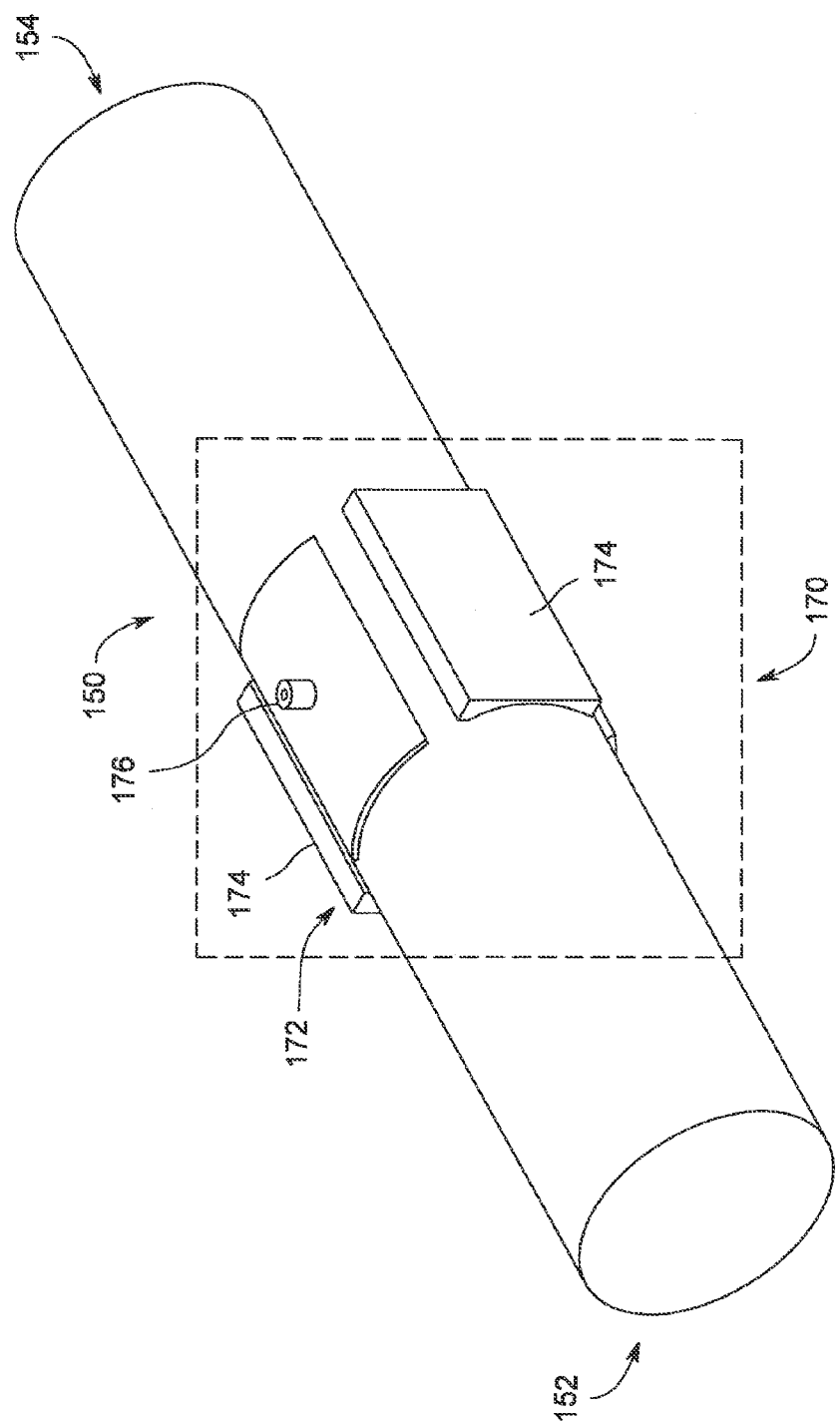
FIG. 4 is a perspective view of an exemplary liquid vapor generator (LVG) that may be used with the subsea power generation assembly shown in FIGS. 2 and 3.
Figure 5:
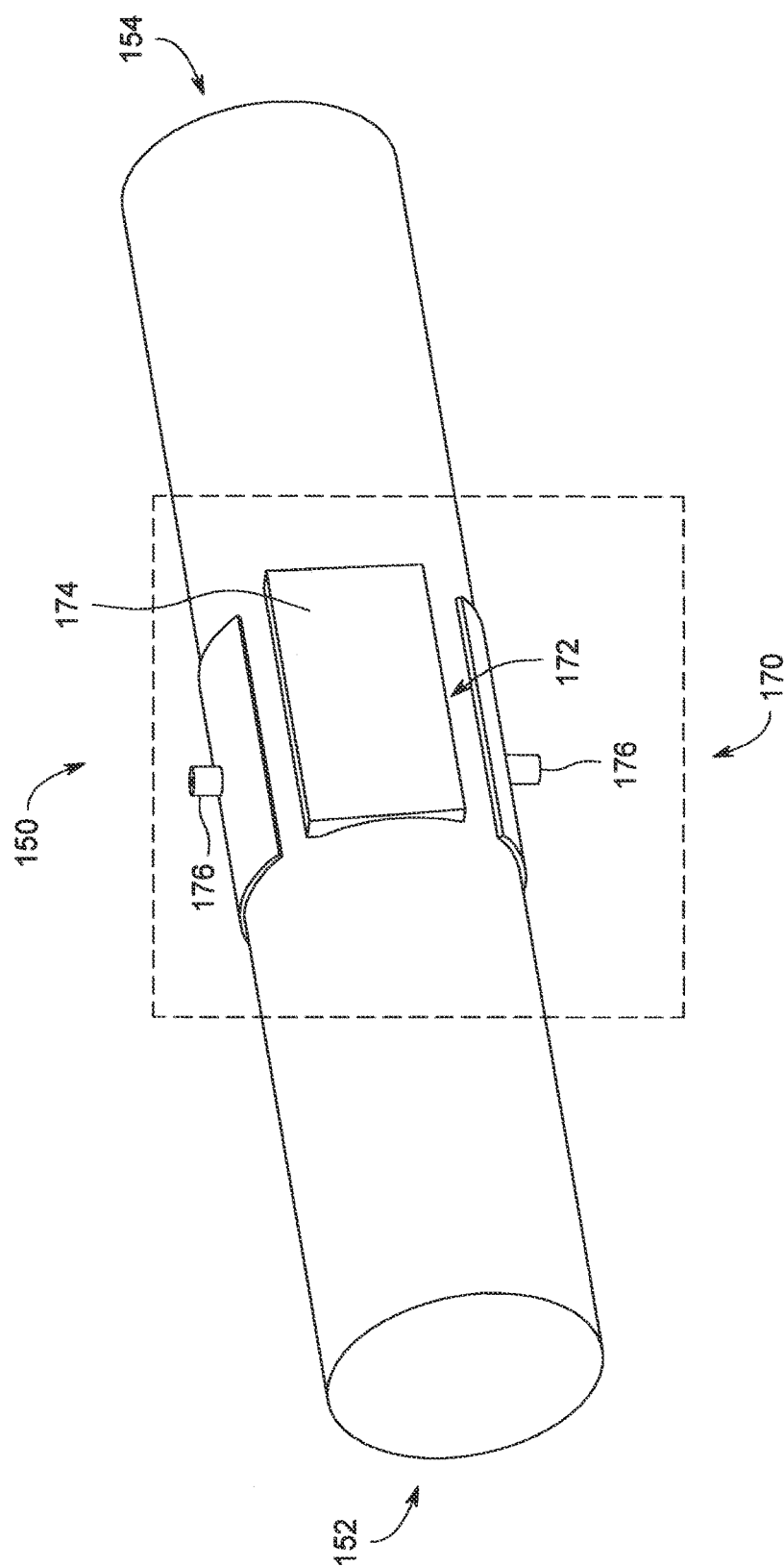
FIG. 5 is another perspective view of the LVG shown in FIG. 4.

FIG. 4 is a perspective view of liquid vapor generator (LVG) 150 that may be used with subsea power generation assembly 106 (shown in FIG. 2). FIG. 5 is another perspective view of LVG 150. LVG 150 includes a power generator 170 positioned between evaporator portion 152 and condenser portion 154. Power generator 170 includes a magnetic field apparatus 172 that includes a plurality of rare earth permanent magnets 174 (two shown in FIG. 4 and only one shown in FIG. 5). In the exemplary embodiment, rare earth permanent magnets 174 are formed from an alloy of neodymium, iron and boron ($Nd_2Fe_{14}B$), sometimes abbreviated as NIB. Also, rare earth permanent magnets 174 have a magnetic field strength, i.e., a remanence of approximately 1 Tesla (T). Further, magnets are positioned opposite each other in LVG 150. Alternatively, any number of rare earth permanent magnets 174 in any configuration are formed from any materials and with any remanence that enables operation of LVG 150 as described herein, including, without limitation, samarium-cobalt magnet alloys. Rare earth permanent magnets 174 have an advantage over electromagnetic devices in that rare earth permanent magnets 174, with a known remanence life span, require less maintenance and no external power sources. Further, in the exemplary embodiment, power generator 170 includes a plurality of Hall generator electrodes 176 (only one shown in FIG. 4 and two shown in FIG. 5) positioned opposite each other and orthogonally with magnets 174. Alternative embodiments include any number and any orientation of Hall generator electrodes 176 that enables operation of LVG 150 as described herein.

Figure 6:
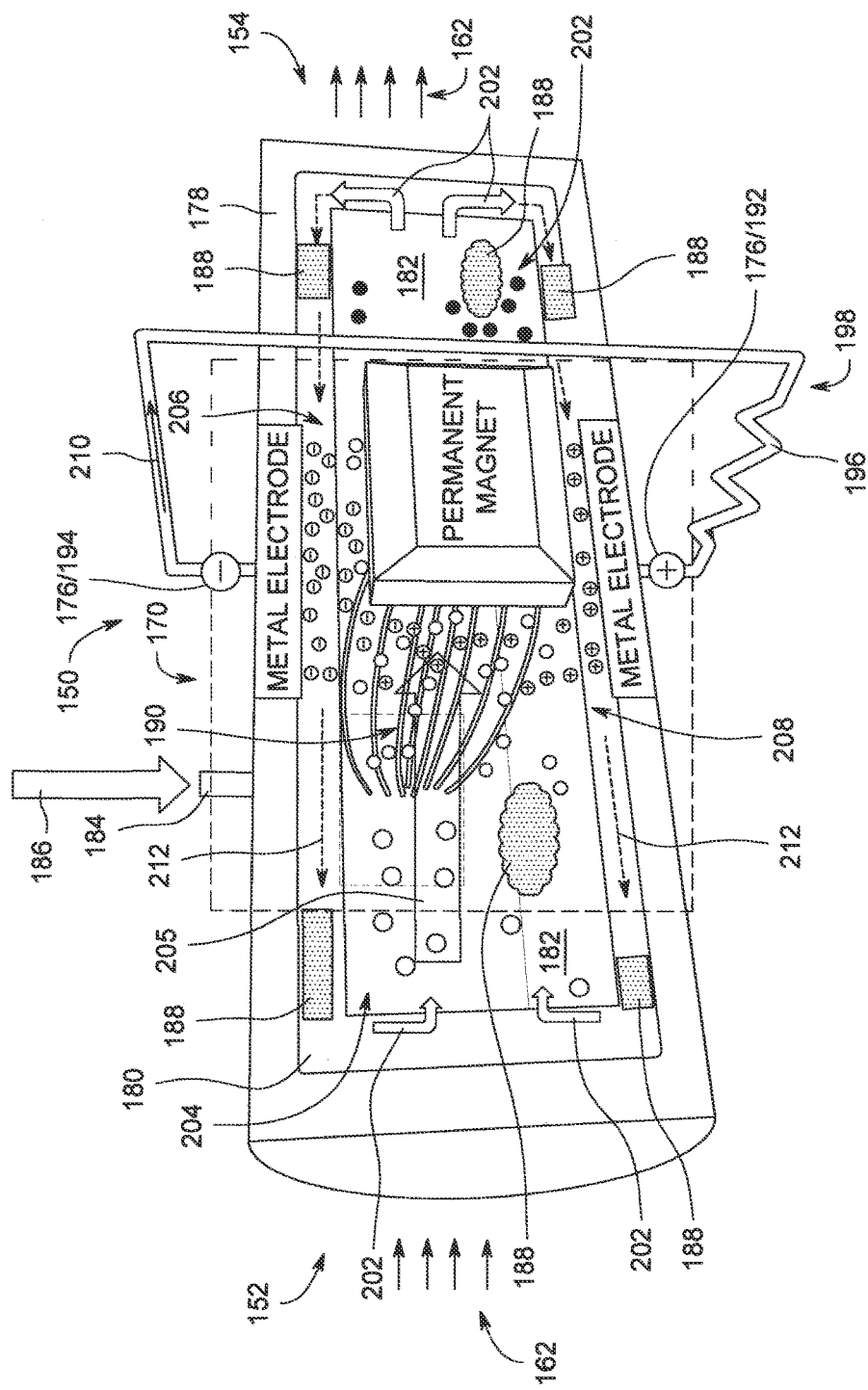
FIG. 6 is a schematic perspective view of the LVG shown in FIGS. 4 and 5.
Figure 7:
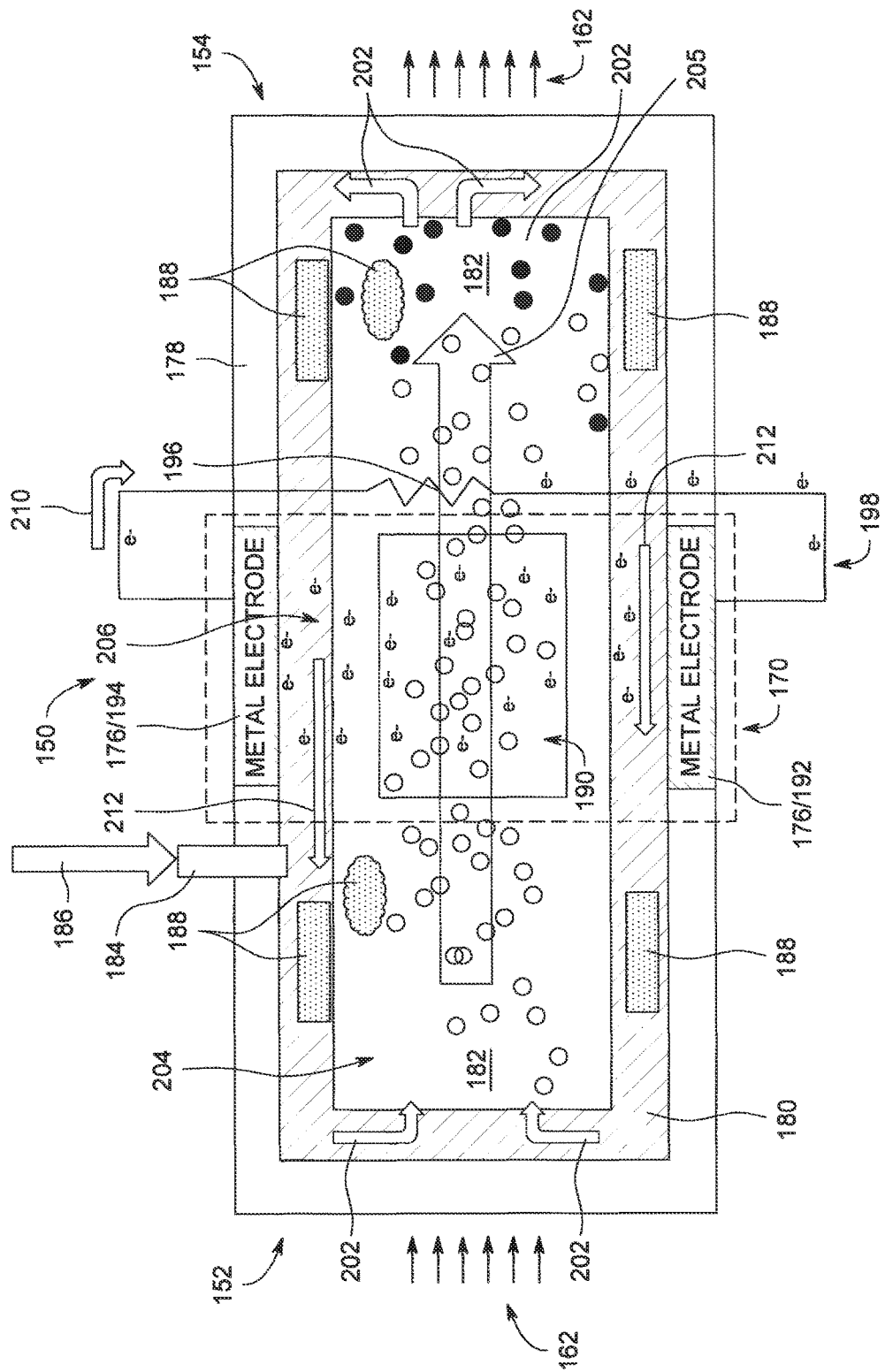
FIG. 7 is another schematic perspective view of the LVG shown in FIG. 6.

FIG. 6 is a schematic perspective view of LVG 150 and FIG. 7 is another schematic perspective view of LVG 150. LVG 150 includes a casing 178 that hermetically seals the interior of LVG 150 from the subsea environment. In the exemplary embodiment, casing 178 is formed from a ceramic material. Alternatively, any material that enables operation of LVG 150 as described herein is used, including, without limitation, pressure-resistant and water-resistant plastics. LVG 150 also includes an electrically non-conductive wick structure 180. Casing 178 is coupled to, and extends about, wick structure 180. Wick structure 180 is a porous, sintered ceramic material configured to channel a hybrid working liquid (discussed further below) from condenser portion 154 to evaporator portion 152 through capillary action. Wick structure 180 defines an interior cavity 182 of LVG 150. A fill tube 184 extends from, and extends through, casing 178 and to wick structure 180. Alternatively, fill tube 184 extends through wick structure 180 into interior cavity 182.

Also, in the exemplary embodiment, the pressure in interior cavity 182 is adjusted to facilitate two-phase operation, i.e., and without limitation, a vacuum is pulled on interior cavity 182 to a predetermined value. Vacuum on interior cavity 182 may be pulled using a vacuum connection (not shown). A hybrid working fluid 186 is channeled through fill tube 184 and fill tube 184 is sealed through welding.

In some embodiments, hybrid working fluid 186 includes nanoparticles 188 that are formed from a metallic material that is substantially non-magnetic and substantially electrically-conducting. Such metallic materials are selected based on their characteristics that include forming free electrons and include, without limitation, gold, silver, aluminum, and copper.

In some embodiments, such fluid includes a metal with a relatively low melting point, i.e., a melting point less than 100 degrees Celsius (° C.) (212 degrees Fahrenheit (° F.)) at atmospheric pressure. Such metals include, without limitation, alkali metals such as sodium, cesium, and potassium, and other metals such as mercury and gallium. Alternatively, metals with any liquefaction temperature at any pressure that enable operation of LVG 150 as described herein are used. Some of the embodiments with liquid metals do not require the use of nanoparticles, however, such metallic nanoparticles may enhance operation of LVG 150. Alternatively, in some embodiments, hybrid working fluid 186 includes a non-metallic fluid that has a boiling point less than 100° C. (212° F.) at atmospheric pressure. Such non-metallic liquids include, without limitation, ammonia, methyl alcohol, benzene, bromine, butane, isopropyl alcohol, and methanol. The embodiments with such non-metallic liquids require the addition of nanoparticles 188. Hybrid working fluid 186 will operate as a two-phase working fluid, i.e., in liquid and gaseous states.

In the exemplary embodiment, the materials for wick structure 180, the metallic liquid, the non-metallic liquid, and metallic nanoparticles 188 are selected for characteristics that include, without limitation, chemical compatibility, liquefaction temperatures, and vaporization temperatures. For example, and without limitation, in some embodiments, metallic nanoparticles 188 are chemically bound to molecules of hybrid working fluid 186.

Also, in the exemplary embodiment, nanoparticles 188 and the pores of wick structure 180 are mutually sized to facilitate channeling nanoparticles 188 through wick structure 180 from condenser portion 154 to evaporator portion 152. Furthermore, the predetermined sizes of the pores within wick structure 180 are enlarged as a function of increases in predetermined heat flux 162 into interior cavity 182. As such, the size of the pores and the dimensions of wick structure 180 are selected to facilitate transonic flow of hybrid working vapor 204. For example, and without limitation, the pores are sized in a range between an order of magnitude of hundreds of microns and thousands of microns. In FIGS. 6 and 7, only a portion of nanoparticles 188 are shown within LVG 150 for clarity.

Further, in the exemplary embodiment, rare earth permanent magnets 174 generate a magnetic field 190. Electrodes 176 include a metallic positive electrode 192 and a metallic negative electrode 194 with at least one electrical load 196 coupled to electrodes 192 and 194 to define an electrical circuit 198. Examples of load 196 include, without limitation, auxiliary electric power for motors and lighting on the production rig, and undersea motors for facilitating subsea pumping operation.

At least a portion of casing 178 is electrically non-conductive. Specifically, a portion of casing 178 proximate electrodes 192 and 194 is electrically non-conductive. Also, at least a portion of casing 178 is non-magnetic. Specifically, a portion of casing 178 proximate magnets 174 is non-magnetic. Any electrically non-conductive and non-magnetic material that enables operation of LVG 150 as described herein is used, including, without limitation, pressure-resistant and water-resistant plastics and ceramics.

Operation of LVG 150 to generate power in an undersea environment is described using either a metallic liquid or a non-metallic liquid, both with entrained nanoparticles 188.

Operation of LVG 150 with a metallic liquid and without metallic nanoparticles is similar.

Referring to FIGS. 6 and 7, in operation, hot fluid flow 160 (shown in FIGS. 2 and 3) is initiated from subsea wellhead 110 through subsea tree 108 (both shown in FIG. 1) to fluid channel 132 (shown in FIGS. 2 and 3). Hot fluid 160 transfers heat energy 162 to evaporator portion 152. Heat energy 162 enters evaporator portion 152 and converts, i.e., evaporates a hybrid working liquid 202 in wick structure 180 and in interior cavity 182 proximate evaporator portion 152 to a hybrid working vapor 204. In the exemplary embodiment, the operating temperature of hybrid working vapor 204 is within the range of approximately 600° C. (1112° F.) and 900° C. (1652° F.). Alternatively, any temperature range for the predetermined pressure within interior cavity 182 that enables operation of LVG 150 as described herein is used.

Also, in operation, vapor 204 is channeled at a high velocity, e.g., without limitation, at approximately sonic velocities and transonic velocities in a direction shown by flow arrow 205 that is approximately orthogonal with respect to magnetic field 190. Lorentz forces induced by field 190 separate free electrons 206 from positive ions 208 (only shown in FIG. 6). An electromagnetic Hall potential across positive electrode 192 and negative electrode 194 is generated and induces electric current flow 210 to power load 196, thereby facilitating magnetohydrodynamic (MHD) power generation in LVG 150.

Further, in operation, hybrid working vapor 204 continues to flow into condenser portion 154, where heat energy 162 is transferred from hybrid working vapor 204 to the surrounding subsea environment. Hybrid working vapor 204 is condensed into hybrid working liquid 202 that is channeled into wick structure 180 and hybrid working liquid 202 is channeled, using capillary action as shown by arrows 212, from condenser portion 154 to evaporator portion 152, thereby establishing a hybrid working liquid flow path extending between condenser portion 154 to evaporator portion 152, and further establishing a natural circulation heat transfer cycle with two-phase hybrid working fluid 186.

In the embodiments discussed above, gravity plays a small role in the flow of hybrid working fluid 186 as hybrid working liquid 202 and hybrid working vapor 204, including magnetic nanoparticles 188. Specifically, assuming LVG 150 is substantially orthogonal to gravitational forces, such gravitational forces facilitate downward travel of hybrid working fluid 186 such that a bottom portion of wick structure 180 may channel more fluid 186 from condenser portion 154 to evaporator portion 152 than an upper portion of wick structure 180. Alternatively, LVG 150 is configured to be positioned at a predetermined angle with respect to subsea floor 112 (shown in FIG. 1) such that condenser portion 154 is higher than evaporator portion 152. In some such alternative embodiments, vapor 204 is channeled upward from evaporator portion 152 toward condenser portion 152 and gravitational forces assist the wick-assisted capillary action of channeling condensed liquid 202 downward from condenser portion 154 to evaporator portion 152. In other such alternative embodiments, wick structure 180 may not be necessary and condensed liquid 202 is channeled downward from condenser portion 154 to evaporator portion 152 along interior walls of casing 178.

Figure 8:
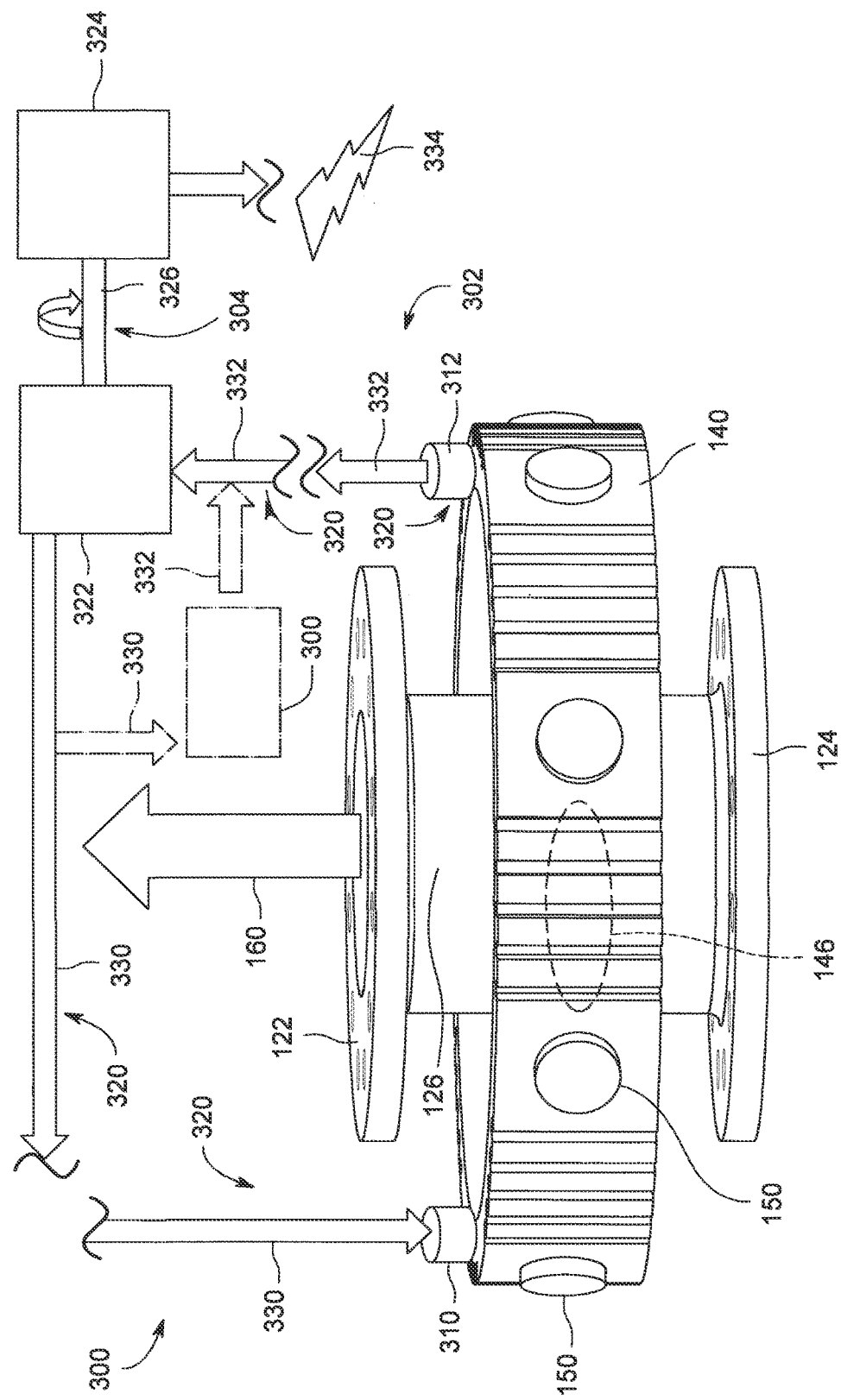
FIG. 8 is a perspective view of an alternative subsea power generation assembly that may be used with the submersible resource recovery system shown in FIG. 1.

FIG. 8 is a perspective view of an alternative a subsea power generation assembly 300 that may be used with subsea production facility 100 (shown in FIG. 1). Subsea power generation assembly 300 is a portion of a larger subsea power generation system 302 that includes a plurality of assemblies 300 (only one shown) and a turbomachine 304. Subsea power generation assemblies 300 are positioned in any configuration that enables operation of subsea power generation system 302 as described herein, including, without limitation, one of stacked in a serial relationship such that fluid flow 160 is received by each assembly 302, and positioned in parallel to each other and each assembly 300 receiving a separate fluid flow 160 from a different wellhead 110 (shown in FIG. 1).

Subsea power generation assembly 300 is similar to subsea power generation assembly 106 (shown in FIGS. 2 and 3) with the differences set forth below. Each assembly 300 includes a heat transfer medium inlet connection 310 and a heat transfer medium outlet connection 312 coupled to heat exchanger 140. Connections 310 and 312 are coupled in flow communication with turbomachine 304, and connections 310 and 312 at least partially define a steam generation system 320. As such, in the exemplary embodiment, the heat transfer medium is demineralized water. Alternatively, the heat transfer medium is any fluid that enables operation of assembly 300 as described herein.

Turbomachine 304 includes a steam turbine 322 rotatably coupled to an electric power generator 324 through a rotatable shaft 326. Turbomachine 304 has any configuration that enables operation of assembly 300 and subsea power generation system 302 as described herein. Turbomachine 304 is on one of an associated production rig, a separate floating platform or barge, or a land-based facility.

In operation, fluid flow 160 transfers heat energy to LVGs 150 that operate as described above. The heat energy in LVGs 150 is transferred to a condensate 330 channeled through heat exchanger 140. Steam 332 is generated in heat exchanger 140, where steam 332 is either saturated steam or superheated steam. Steam 332 is channeled to steam turbine 322 that drives generator 324 through rotation of shaft 326. Steam 332 is condensed into condensate 330 upon exit from steam turbine 322 for return to heat exchangers 140. Generator 324 generates electric power 334 for distribution in a manner similar to the electric power generated by LVGs 150.

The above-described submersible electric power generators described herein facilitate extended operation in undersea environments, including submersible resource recovery system. Specifically, the submersible liquid-vapor generators (LVGs) described herein use magnetohydrodynamic (MHD) apparatus with nanoparticles entrained in a two-phase fluid that is channeled through a magnetic field to generate a voltage. Such nanoparticles are substantially electrically-conducting and substantially non-magnetic materials. In contrast to known MHD systems, the nanoparticles remain entrained in the fluid as it proceeds through a hermetically closed loop cycle, i.e., as they transit through a condenser and evaporator. Particle mixers and separators are no longer required, therefore the LVGs disclosed herein are simpler, lighter, more reliable, and cheaper to assemble than known MHD systems. Entrainment of the nanoparticles is facilitated by configuring the interior channels such that transonic flow from the evaporator to the condenser through the magnetic field is enabled. Moreover, the entrained nanoparticles are configured to be light enough to facilitate the transonic flow. The hermetically-sealed configuration as described herein substantially eliminates moving parts, thereby facilitating reliability for extended submerged power generation operations. The heat transferred into the liquid and the nanoparticles and subsequently removed in the condenser is transferred to any of a variety of bottoming systems for secondary electric power generation. The LVGs as described herein are both scalable and stackable to meet the electric power needs of most known undersea configurations.

An exemplary technical effect of the methods, systems, and apparatus described herein includes at least one of: (a) electrically-conducting, non-magnetic nanoparticles remain entrained in a two-phase fluid as it transits through a hermetically closed loop cycle, i.e., as they transit through a condenser and evaporator; (b) eliminating the need for particle mixers and separators for injecting and removing nanoparticles from a working fluid therein; (c) facilitating entrainment of nanoparticles in a working fluid with interior channels that are configured such that transonic flow from an evaporator to a condenser through the magnetic field is enabled; and facilitating extended power generation support for submersible resource recovery systems.

Exemplary embodiments of methods, systems, and apparatus for operating power generation systems are not limited to the specific embodiments described herein, but rather, components of systems and/or steps of the methods may be utilized independently and separately from other components and/or steps described herein. For example, the methods, systems, and apparatus may also be used in combination with other systems requiring a heat pipe for heat transfer and power generation, and the associated methods, and are not limited to practice with only the systems and methods as described herein. Rather, the exemplary embodiment can be implemented and utilized in connection with many other applications, equipment, and systems that may benefit from using a heat pipe for heat transfer and power generation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of generating power in an undersea environment, said method comprising:
    submerging a subsea power generation assembly in the undersea environment, the subsea power generation assembly including:
        a substantially annular heat exchanger at least partially extending about a heat source; and
        a plurality of submersible liquid-vapor generators (LVGs) coupled to the heat exchanger and the heat source, each LVG of the plurality of LVGs extending radially outward from the heat source to the substantially annular heat exchanger, each LVG including:
            an evaporator portion in heat transfer communication with the heat energy source:
            a magnetic field apparatus coupled in flow communication with the evaporator portion;
            a condenser portion coupled in flow communication with the magnetic field apparatus;
            a hybrid working fluid including nanoparticles, wherein the evaporator portion, the magnetic field apparatus, and the condenser portion at least partially define a hybrid working vapor flow path; and
            an electrically non-conductive wick structure coupled in flow communication with the evaporator portion and the condenser portion, the wick structure at least partially defining a hybrid working liquid flow path extending between the condenser portion and the evaporator portion;
    forming the hybrid working liquid comprising combining a liquid and the nanoparticles;
    transferring heat energy from the heat source into the hybrid working liquid, thereby evaporating the hybrid working liquid into a hybrid working vapor;
    channeling the hybrid working vapor through a magnetic field, thereby inducing a voltage on an electric current carrying conductor;
    transferring heat energy from the hybrid working vapor, thereby condensing the hybrid working vapor into the hybrid working liquid; and
    channeling the hybrid working liquid toward the heat source.

2. The method in accordance the claim 1, wherein combining a liquid and nanoparticles comprises mixing substantially non-magnetic and substantially electrically-conducting nanoparticles with a metal liquid.

3. The method in accordance the claim 1, wherein combining a liquid and nanoparticles comprises mixing substantially non-magnetic and substantially electrically-conducting nanoparticles with a fluid having a boiling point less than 100° C. at atmospheric pressure.

4. The method in accordance the claim 1, wherein transferring heat energy from a heat source comprises transferring heat from a fluid channeled from a subsea wellhead into the hybrid working liquid in the evaporator portion of each LVG.

5. The method in accordance with claim 1, wherein inducing a voltage on an electric current carrying conductor comprises powering an electric load.

6. The method in accordance with claim 1, wherein condensing the hybrid working vapor into the hybrid working liquid comprises transferring the heat energy from the hybrid working vapor into a steam generation system configured to drive a turbomachine including an electric generator.

7. The method in accordance with claim 1, wherein channeling the hybrid working liquid toward the heat source comprises channeling the hybrid working liquid through the electrically non-conductive wick structure using capillary action.

8. A subsea power generation assembly comprising:
    a substantially annular heat exchanger at least partially extending about a heat source; and
    a plurality of submersible liquid-vapor generators (LVGs) coupled to said heat exchanger and said heat source, each LVG of said plurality of LVGs extending radially outward from said heat source to said substantially annular heat exchanger, said each LVG comprising:
        an evaporator portion in heat transfer communication with a heat energy source;
        a magnetic field apparatus coupled in flow communication with said evaporator portion;
        a condenser portion coupled in flow communication with said magnetic field apparatus;
        a hybrid working fluid comprising nanoparticles, wherein said evaporator portion, said magnetic field apparatus, and said condenser portion at least partially define a hybrid working vapor flow path; and
an electrically non-conductive wick structure coupled in flow communication with said evaporator portion and said condenser portion, said wick structure at least partially defining a hybrid working liquid flow path extending between said condenser portion and said evaporator portion.

9. The subsea power generation assembly in accordance with claim 8, wherein said heat exchanger comprises:
a heat transfer medium inlet connection; and
a heat transfer medium outlet connection, wherein said heat transfer medium inlet connection and said heat transfer medium outlet connection are coupled to at least one turbomachine.

10. The subsea power generation assembly in accordance with claim 9, wherein said heat transfer medium inlet connection and said heat transfer medium outlet connection at least partially define a steam generation system.

11. The subsea power generation assembly in accordance with claim 8, wherein said condenser portion is coupled in heat transfer communication with said heat exchanger.

12. The subsea power generation assembly in accordance with claim 8, wherein said hybrid working fluid further comprises a metal in one of liquid and gaseous states and said nanoparticles are substantially non-magnetic and substantially electrically-conducting.

13. The subsea power generation assembly in accordance with claim 8 further comprising a power generator comprising said magnetic field apparatus and a plurality of electrodes.

14. The subsea power generation assembly in accordance with claim 8, wherein said hybrid working fluid further comprises a fluid having a boiling point less than 100° C. at atmospheric pressure in one of liquid and gaseous states and said nanoparticles are substantially non-magnetic and substantially electrically-conducting.

15. The subsea power generation assembly in accordance with claim 8, wherein said substantially annular heat exchanger comprises a plurality of ridges defining a plurality of grooves, thereby increasing a heat transfer surface area of said substantially annular heat exchanger.

16. The subsea power generation assembly in accordance with claim 8, wherein said heat source comprises a pipeline portion comprising a plurality of flanges, said plurality of flanges facilitating scalability and stackability of said plurality of LVGs.

17. The subsea power generation assembly in accordance with claim 8, wherein said magnetic field apparatus comprises a permanent magnet.

18. The subsea power generation assembly in accordance with claim 8 further comprising a casing coupled to and extending about said electrically non-conductive wick structure, at least a portion of said casing electrically non-conductive.

19. The subsea power generation assembly in accordance with claim 18, wherein said casing comprises a ceramic material that facilitates hermetically sealing said each LVG of said plurality of LVGs.

20. The subsea power generation assembly in accordance with claim 8, wherein said evaporator portion and said condenser portion define opposite ends of said each LVG of said plurality of LVGs, said magnetic field apparatus positioned therebetween.

21. The subsea power generation assembly in accordance with claim 8, said electrically non-conductive wick structure configured to channel said hybrid working liquid using capillary action.

\* \* \* \* \*